Jan. 9, 1968    M. E. LINDSAY    3,362,391
ENGINE OVERHEAD VALVE GEAR
Filed Oct. 22, 1965    2 Sheets-Sheet 1
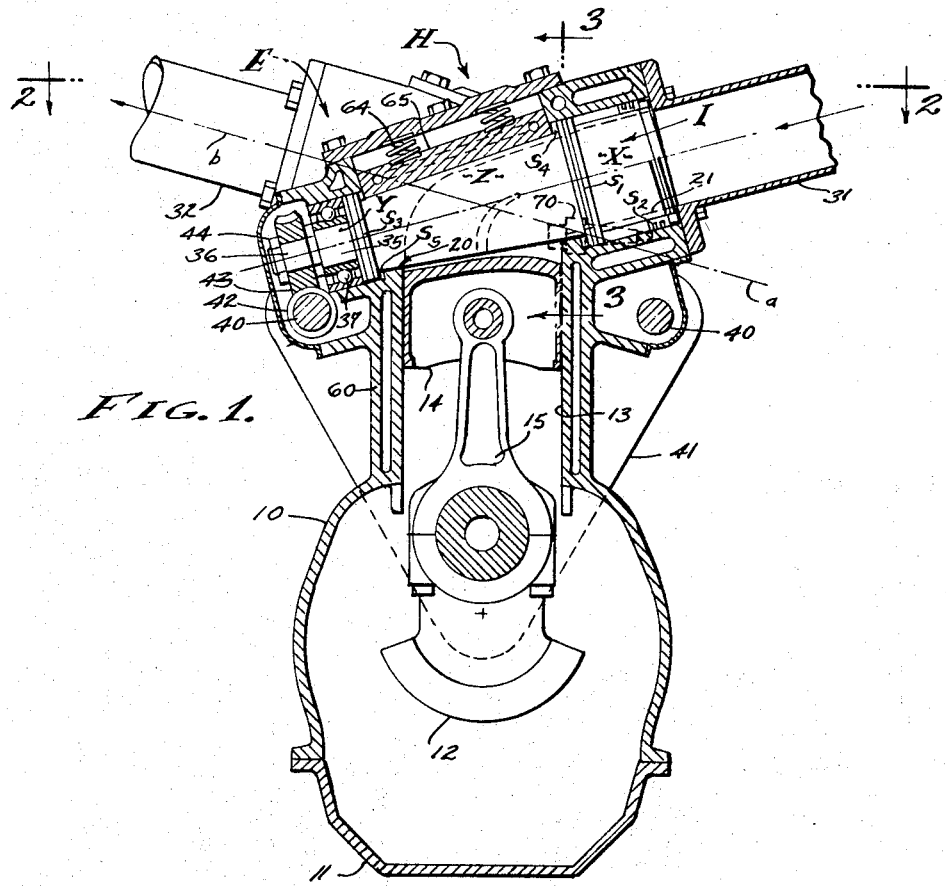
INVENTOR.
MAURICE E. LINDSAY
BY
AGENT

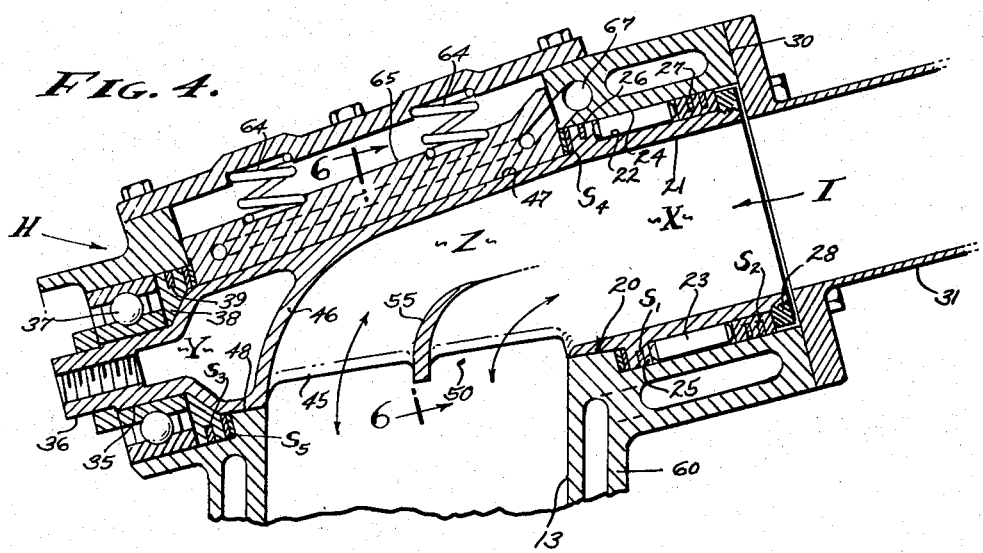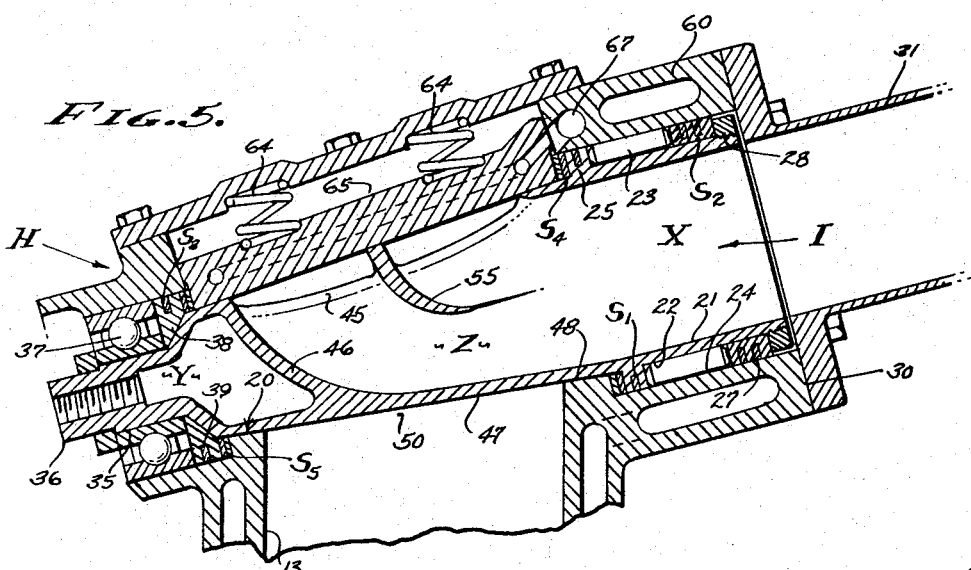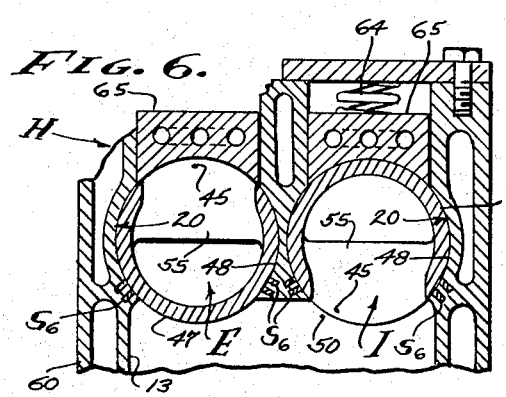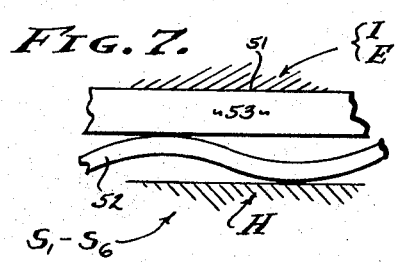

United States Patent Office 3,362,391
Patented Jan. 9, 1968

3,362,391
ENGINE OVERHEAD VALVE GEAR
Maurice E. Lindsay, 700 E. Holly St., 7,
El Segundo, Calif. 90245
Filed Oct. 22, 1965, Ser. No. 501,867
10 Claims. (Cl. 123—190)

ABSTRACT OF THE DISCLOSURE

This invention has to do with internal combustion engines and relates to the valves thereof whereby the process of the intake-compression-power-exhaust cycle is carried out, it being an object of this invention to increase port area whereby maximum breathing is made possible and to decrease inertial loads whereby acceleration and/or deceleration of valve gear elements is minimized.

---

The internal combustion engine art is presently considered to be developed to its utmost with respect to the long accepted and highly developed reciprocating poppet-type valves. In high performance engines the most highly developed valve gear involves dual overhead cam-shafts, each of which depresses a valve against a return spring, whereby the valve element thereof opens inwardly into the cylinder. Universally, there is an outwardly inclined intake valve at one side of the cylinder head, and there is an outwardly inclined exhaust valve at the other side of the cylinder head. The ultimate refinement, speaking generally, is the provision of both dual intake and dual exhaust valves, in which case there are four valves per cylinder, and it is usual that the intake valves are somewhat the larger. Due to the circular configuration of the cylinder diameter with respect to the grouping of the valve diameters, there is a definite limitation in effective port area. It is this effective area which it is the general object of this invention to increase, and with the present invention the increase is substantial and to the end that the usually accepted obstructions to gas flow are virtually eliminated.

With the long accepted valve gear as briefly described above, there is also the problem of rapid intermittent movement. That is, it has been accepted that engine intake and exhaust valves must be cam operated, in which case they pop open and pop shut, thereby acquiring their name "poppet-type valves." In this respect, it is obvious that such prior art valves must be violently accelerated and decelerated during engine operation, all of which is attendant with the application of stress and strain and consequential undue extraction of power from the engine. To this end, therefore, it is an object of this engine to provide a valve gear that can be operated with continuity of motion and consequently reducing acceleration and deceleration forces.

In addition to the general foregoing objectives there are many tributary objectives such as: to eliminate frictional high pressure against the cams with tappet followers; to eliminate high tension return springs; to eliminate the necessity of clearance adjustment means; to eliminate the movement of valve elements into the cylinder chamber; to eliminate obstructed and tortuous paths of gas flow; and above all to eliminate the surplusage of mechanism which is usually found in the area overlying the intake and exhaust porting. With this invention, each of the above mentioned objectives is met with substantial improvements, all of which can be quickly observed by referring to the drawings of the preferred embodiment of the instant valve gear.

It is also an object of this invention to provide valving of the character referred to which is conducive to acceptably improved combustion chamber designs wherein spark ignition and/or fuel injection is employed as circumstances require. With the valving hereinafter described, the piston head is suitably domed in order to gain so called "squish area," "quench area" and "combustion area," and all without interferences from the usual inwardly moved valve elements. In other words, relief depressions for the association of moving parts need not be made in the piston head as is now the common and required practice.

The various objects and features of this invention will be fully understood from the following detailed description of the typical preferred form and application thereof, throughout which description reference is made to the accompanying drawings, in which:

FIG. 1 is a transverse sectional view taken through a typical high performamnce internal combustion engine with the overhead valve gear of the present invention incorporated therein.

FIGS. 2 and 3 are views of the valve elements per se, removed from but in their respective interrelated positions to each other, FIG. 2 being taken substantially as indicated by line 2—2 on FIG. 1, and FIG. 3 being taken substantially as indicated by line 3—3 on FIG. 1.

FIGS. 4 and 5 are enlarged detailed views of the valve structure, FIG. 4 showing the valve opened as it is in FIG. 1, and FIG. 5 showing the valve closed.

FIG. 6 is a detailed cross-sectional view taken as indicated by line 6—6 on FIG. 4, and FIG. 7 is an enlarged fragmentary view of a typical one of the gas seals.

This invention is confined to the improvement of valve gear that has its useful purpose in the constructing of internal combustion reciprocating engines and the like. Whether the engine is of the two stroke or four stroke type is but a matter of choice. However, it is the four stroke engine that is most widely employed and it is to such an engine that I have shown the present invention applied. Therefore, a typical four stroke type cylinder and piston engine is illustrated wherein there is a crank case and/or block 10 enclosed by a pan 11 and in which a crank 12 revolves. There is a cylinder 13 jacketed in the block 10 on an axis normal to the crank and a piston 14 reciprocably operable in the cylinder and coupled to the crank by a connecting rod 15. The foregoing are the generally accepted and basic parts of an internal combustion engine and to which the unique head H of the present invention is applied. In order to facilitate the following disclosure and as is the practice with many high performance engines, the head H is shown integral with the block 10, it being understood that such a head can be separately manufactured and attached to the block if so desired. However, the present invention does lend itself to an integral construction inasmuch as the machining of the valving, insofar as the head and block are concerned, is performable externally. Therefore, blind machine work is virtually eliminated, even though the head is integral with the cylinder.

In accordance with this invention, the two valves, intake and exhaust, are alike and a description of one will suffice for the other; and in the broad sense a single valve made according to the present invention has utility as in a two stroke engine. However, the two valves as shown are employed to particular advantage because of the cooperative arrangement of one relative to the other whereby maximum advantage is taken of the area which they occupy. In this respect it is to be observed that the two valves are oppositely tapered and nest together in a most advantageous manner, whereby each valve is exposed throughout the greater part of its half of the cylinder area. As a result, gasses are induced and/or exhausted in a most efficient manner, and through unobstructed ports, each of which ports nearly approaches half the cylinder area (when two valves are involved).

In the preferred arrangement there are two valves, an intake valve I and an exhaust valve E, and each of which is a revolvable tubular element open at one end and ported laterally for communication into the cylinder chamber above the piston. The tubular form of the valve element is turned so that the valves are rotatable, and in accordance with the invention the axis of the valves are transverse with respect to the cylinder axis. Further, the axes of the two valves are substantially parallel in plan view, although they can be advantageously disposed divergently in plan view (not shown) with respect to each other, and each valve axis is inclined for purposes to be described. Characteristically, the induction of gasses is along the inclined axis of the intake valve I projecting at one side of the head H, and the exhaust of gasses is along the inclined axis of the exhaust valve E projecting at the other side of the head H. That is, the tubular valves I and E project on inclined axes at opposite sides of the head H, and to this end the head is provided with turned valve bores 20 disposed on adjacently related oppositely inclined axes $a$ and $b$. It is on these two oppositely inclined axes $a$ and $b$ that the two valves I and E are independently rotatable through drive means A.

The valves I and E are tapered cone-shaped tubes having an enlarged gas induction and/or exhaust portion X, having a reduced drive portion Y, and having an intermediate port portion Z. The portions X, Y and Z are integrally formed of one body of material the majority of features of which are turned about an axis, thereby establishing the tapered configuration. The gas handling portion X is a cylindrical element with a smooth interior bore 21 and an outer cylindrical bearing face 22 rotatably carried by roller bearings 23 operating within a bearing race 24 in the head H. A gas seal $S_1$ is provided at the innermost end of the portion X, in the form of a peripheral flange 25 with a radially expansible ring 26 having sealing engagement with an inward extension of the bearing race 24. Further, the bearings 23 are retained by a gas seal $S_2$ at the outermost end of the portion X, in the form of a circular member with radially expansible rings 27 and secured in place by a retainer 28 threadedly engaged with the outer end of the portion X.

The head H is machined from the enlarged end portion X to have the bearing race 24 and a laterally disposed face 30 in a plane normal to the axis and adapted to fixedly receive a manifold tube, a gas induction tube 31 or a gas exhaust tube 32, as the case may be. Such a fixed installation is shown throughout the drawings wherein the tube 31–32 is secured to the head H by means of a flange 34.

The drive portion Y is a trunnion element with a boss 35 and a shaft 36 extending from the boss. The boss 35 and shaft 36 are concentrically turned, the boss being rotatably carried by an anti-friction bearing 37 supported in the head H, while the shaft 36 extends from the head for driving engagement with the means A. This end portion of the valve element is characteristically blind and a gas seal $S_3$ is provided at the innermost end of the portion Y, in the form of a removable peripheral flange 38 with a radially expansible ring 39 having sealing engagement with an inward extension of the support for bearing 37.

The drive means A can vary as circumstances require, a gear drive being shown and which serves to revolve the valve I–E. It is to be understood that the drive means can be an intermittent drive, such as to periodically decelerate and in some instances to periodically arrest motion of the valve. However, in its simplest form the valve I–E can be revolved continuously in timed relation to the crank shaft rotation, in which case the drive means A involves a driving shaft 40 extended to or along the drive portion Y and geared to the shaft 36 to rotate the same. Thus, the shaft 40 remains in coupled engagement with shaft 36, and in the event that shaft 40 operates continuously, so does the shaft 36 and valve I–E. As shown, the drive means A involves a chain drive, or the like, from the crank shaft 12, as is indicated at 41 in FIG. 1, and a worm 42 on the shaft 40 that revolves a wheel 43 keyed to the shaft 36 and secured thereto by a nut 44. Thus, a close coupled and efficient drive is provided for revolving the valves I–E in timed relation to rotation of the crank 12.

The intermediate port portion Z is a cone-shaped tube and is the element which characterizes the valve I–E. This port portion opens laterally at one side of the valve, and in carrying out the invention features a port 45, with an opening area equal to, approximately at least, the cross-sectional area of the smooth interior bore 21 through the gas handling portion X. As is best illustrated in FIGS. 4 and 5 the intermediate portion Z is blinded at its reduced end adjacent portion Y, by means of a transverse wall 46 that extends from the open periphery of the valve to the closed interior thereof diametrically opposite the lateral port 45. In its preferred form, said wall 46 (when the valve is in an opened position) extends tangentially from the cylinder wall of the engine and extends tangentially to the interior wall of the valve I–E, in a fair curve. The end of portion Z at the first described portion X is fully open to the inside diameter of said first described gas handling portion, and as a result the combined portions X and Z establish an unobstructed passage turned or deflected to open laterally into the engine cylinder and convergently tapered toward the wall 46 as the gasses are passed progressively through an ever widening (or narrowing) passage opening at the port 45. Both ends of the cone-shaped portion Y are sealed by gas seals $S_4$ and $S_5$ engaged with the flanges 25 and 38 respectively. The seals $S_4$ and $S_5$ are biased seals of the type shown in FIG. 7, having a face 51 wiping against the flange 25–38 and urged thereagainst by means of a spring backer 52.

In accordance with the invention the outer peripheral wall 47 of the valve portion Z is conically tapered and fits into a corresponding tapered portion 48 of bore 20. The said bore 20 has a port 50 corresponding in shape with port 45, so that the shapes of the two ports coincide with the valve when opened, as is the intake valve I throughout the drawings. And, as is shown the ports have a circumferential opening extent of about 90°; being revolvable through a greater portion of its rotation, about 270°, while closed as shown in FIG. 6. In practice the valve wall 47 is free of the bore portion 48, said valve I–E being rotatably journaled upon the opposite end bearings as described. Therefore, the two valves I and E are free to revolve anti-frictionally.

Gas seals $S_6$ extend longitudinally of the intermediate port portion Z of the valve I–E and coextensively with the port openings 45–50. Such seals are shown at both sides of each port 50 in FIG. 6, where they are indicated in cross-section. The seals $S_6$ are in the nature of wipers that extend coextensively with the longitudinal extent of portion Z, being carried in straight grooves in the head H and with exposed faces 51 to engage the peripheral surface of wall 47. In FIG. 7 a typical gas seal $S_1$ through $S_6$ is shown, wherein the face 51 is biased by means of a spring backer 52 into engagement with a wall, such as wall 47 or the flanges 25–38 etc. The spring backer 52 can be marcel spring as shown, to yieldingly press against a sealing bar 53 having the face 51.

As is illustrated, the valve I–E is provided with a bridge 55 across the port 45 thereof, for the purpose of reinforcement, maintaining engagement with the sealing bars 53, and to guide the gas flow. As a reinforcement, the bridge 55 spans the port and extends throughout a half diameter of the tube, and has an angular configuration for rigidity. As a gas seal engagement element, the bridge 55 presents a circular mid-continuation of wall 47 which maintains the seals $S_6$ properly depressed as shown. As a guide for gas flow, the bridge 55 is angularly curved in the same manner as is the wall 46, and is of sharpened blade configuration disposed diametrically across the tube so as to divide the flow between the two parts of the port 45 as shown.

From the foregoing it will be apparent that the two valves I and E are independently rotatable on antifriction bearings, and disposed adjacently to each other on inclined axes. As a result, the structural enlargements associated with the flanges 25 and 38 and the parts related thereto are accommodated above and below each other respectively as especially shown in FIG. 3, despite the overlapping thereof in plan view as shown especially in FIG. 2. It is significant that the tubular valves I and E are arranged closely together where they close at the center of the construction as is shown in FIGS. 2 and 6. Therefore, maximum sized valve tubes are employed while taking full advantage of the tapered configuration thereof, the structural enlargements at portion Y being substantially smaller than the structural enlargements at portion X.

In accordance with the invention the heat dissipation is accomplished in the usual fashion with the provision of water jackets 60 where required throughout the block 10 and head H. Unique with the present invention, however, is the provision of heat dissipating and lubricating means B. As shown throughout the drawings, a pillow block 65 rides upon the side of the valve, and specifically upon the wall 47 opposite the port 50; said pillow block functioning to absorb heat and as well to distribute lubricant onto the wall 47. In carrying out the invention, said block 65 is a porous metallic body, or the like, of highly conductive metal such as a copper alloy, and throughout which oil is readily permeable. To this end, therefore, the pillow block 65 is coextensive with the length of the wall 47 and is conically concaved to have bearing engagement thereon. Spring means 64 yieldingly urges the block 65 into engagement with the wall 47, and there are channels 66 conducting oil therethrough supplied under the usual pressure from a gallery 67 in the head H. Thus, the lubricating oil can be supplied from a cooler (not shown) and utilized for dual purposes, to both lubricate and to cool the valves I and/or E.

It will be apparent from the foregoing that the breathing capabilities of the valves I and E are made to closely approach the half cylinder area, in each instance when employed both as an intake and as an exhaust valve, and driven in timed relation to the crank 12 for such purpose by the means A. In FIGS. 1 and 3 the location of the ignition plug 70, or injection plug as the case may be, is shown and where it occupies the triangular void remaining between the oppositely inclined and opposite ends of the valves I and E. As best illustrated in FIG. 1, the plug 70 is associated with a depressed part of the piston head and which is the combustion area, while the remainder of the piston head is closer to the valve in order to be the squish and quench areas. It is to be understood that the ignition plug location can vary according to chamber design and that dual plugs and/or injectors can be employed. As it is shown, there is a plug 70 readily accessible at either or both sides of the head H.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. Valve gear for opening and closing the cylinder chamber of an engine of the character described and comprising:
    (a) a valve bore in the engine structure and disposed adjacent to the cylinder chamber;
    (b) a port opening through the engine structure between said valve bore and said cylinder chamber;
    (c) a tubular valve carried in said valve bore, with a lateral port therein movable into and out of register with the first mentioned port, and having an outer peripheral wall;
    (d) a heat dissipating and lubricant distribution pillow block of porous heat absorbing metal shiftable in the engine structure and biased radially against the periphery of the tubular valve, and having channels therein receiving and conducting the circulation of lubricant throughout the same;
    (e) and a drive means revolvably positioning the tubular valve.

2. Valve gear for opening and closing the chamber of an engine requiring separate intake and exhaust, and including:
    (a) a pair of adjacently related and oppositely tapered valve bores in the engine structure and disposed on transverse axes with respect to the cylinder chamber axis;
    (b) a port opening through the engine structure between each of said valve bores and said cylinder chamber;
    (c) a tubular and tapered valve carried in each of said valve bores, one for intake and one for exhaust, and each closed at its small end and open at its large end and having a lateral port therein intermediate said ends and movable into and out of register with the first mentioned ports;
    (d) and a drive means separately revolvably positioning the said tubular valves on their respective axes.

3. Valve gear for opening and closing the chamber of an engine requiring separate intake and exhaust, and including:
    (a) a pair of adjacently related valve bores in the engine structure and disposed on oppositely inclined transverse axes with respect to the cylinder chamber axis;
    (b) a port opening through the engine structure between each of said valve bores and said cylinder chamber;
    (c) a tubular valve carried in each of said inclined valve bores, one for intake and one for exhaust, and each having a lateral port therein movable into and out of register with the first mentioned ports;
    (d) and a drive means separately revolvably positioning the said tubular valves on their respective axes.

4. Valve gear for opening and closing the chamber of an engine requiring separate intake and exhaust, and including:
    (a) a pair of adjacently related and oppositely tapered valve bores in the engine structure and disposed on transverse axes with respect to the cylinder chamber axis;
    (b) a port opening through the engine structure between each of said valve bores and said cylinder chamber;
    (c) bearings at the oposite ends of the valve bores on the respective axes thereof;
    (d) a tubular and tapered valve carried rotatably on the bearing in each of said valve bores respectively, one for intake and one for exhaust, and each closed at its small end and open at its large end and having a lateral port therein intermediate said ends and movable into and out of register with the first mentioned ports;
    (e) and a drive means separately revolvably positioning the said tubular valves on their respective axes.

5. Valve gear for opening and closing the chamber of an engine requiring separate intake and exhaust and including:
    (a) a pair of adjacently related valve bores in the engine structure and disposed on oppositely inclined transverse axes with respect to the cylinder chamber axis;
    (b) a port opening through the engine structure between each of said valve bores and said cylinder chamber;
(c) an enlarged bearing means at the opposite end of each valve bore respectively, on the respective axes and adjacently overlapping;
(d) a pair of tubular valves rotatable at one end on said respective bearing means and each free to revolve in its respective valve bore and closed at the other end, one for intake and one for exhaust at said one end, and each having a lateral port therein movable into and out of register with the first mentioned ports;
(e) and a drive means separately revolvably positioning the said tubular valves on their respective axes.

6. Valve gear for opening and closing the chamber of an engine requiring separate intake and exhaust, and including:
(a) a pair of adjacently related valve bores in the engine structure and disposed on oppositely inclined transverse axes with respect to the cylinder chamber axis;
(b) a port opening through the engine structure between each of said valve bores and said cylinder chamber;
(c) enlarged anti-friction bearings at the opposite ends of each bore, on the respective axes and each with its periphery overlapping the bearing on the adjacent and inclined axis;
(d) a pair of tubular valves rotatable on said respective bearings and each free to revolve in its respective valve bore, one for intake and one for exhaust, and each having a lateral port therein movable into and out of register with the first mentioned port;
(e) and a drive means separately revolvably positioning the said tubular valves on their respective axes.

7. Valve gear for opening and closing the chamber of an engine requiring separate intake and exhaust, and including:
(a) a pair of adjacently related valve bores in the engine structure and disposed on oppositely inclined transverse axes with respect to the cylinder chamber axis;
(b) a port opening through the engine structure between each of said valve bores and said cylinder chamber;
(c) bearing means at the opposite ends of each valve bore and at least one of which is circularly enlarged, said means being disposed on the respective axes and with the periphery of circular enlargement overlapping the adjacent and inclined valve bore;
(d) a pair of tubular valves rotatable on said respective bearings and each free to revolve in its respective valve bore, one for intake and one for exhaust, and each having a lateral port therein movable into and out of register with the first mentioned port;
(e) and a drive means separately revolvably positioning the said tubular valves on their respective axes.

8. Vale gear for opening and closing the chamber of an engine requiring separate intake and exhaust and including:
(a) a pair of adjacently related valve bores in the engine structure and disposed on oppositely inclined transverse axes with respect to the cylinder chamber axis;
(b) a port opening through the engine structure between each of said valve bores and said cylinder chamber;
(c) anti-friction bearings at the opposite ends of each valve bore and at least one of which is annular and circularly enlarged, said bearings being disposed on the respective axes and with the periphery of the annular and circularly enlarged bearing overlapping the adjacent and inclined valve bore;
(d) a pair of tubular valves rotatable on said respective bearings and each free to revolve in its respective valve bore, one for intake and one for exhaust, and each having a lateral port therein movable into and out of register with the first mentioned port;
(e) and a drive means separately revolvably positioning the said tubular valves on their respective axes.

9. Valve gear for opening and closing the head to the cylinder chamber of an engine requiring separate intake and exhaust, and including:
(a) a pair of adjacently related valve bores through the head structure and disposed on oppositely inclined transverse axes with respect to the cylinder axis;
(b) a port opening through the head structure between each of said valve bores and the cylinder chamber underlying the head structure;
(c) bearing means at the opposite ends of each valve bore and at least one of which is circularly enlarged, said means being disposed on the respective axes and with the periphery of circular enlargement overlapping the adjacent and inclined valve bore;
(d) a pair of tubular valves rotatable on said respective bearings and each free to revolve in its respective valve bore, one for intake and one for exhaust, and each having a lateral port therein movable into and out of register with the first mentioned port;
(e) and a drive means separately revolvably positioning the said tubular valves on their respective axes.

10. Valve gear for opening and closing the head to the cylinder chamber of an engine requiring separate intake and exhaust, and including:
(a) a pair of adjacently related and tapered valve bores through the head structure and disposed on oppositely inclined transverse axes with respect to the cylinder axis;
(b) a port opening through the head structure between each of said valve bores and the cylinder chamber underlying the head structure;
(c) anti-friction bearings at opposite ends of each valve bore and one at the small end of the bore and one of which is annular and circularly enlarged at the large end of the bore, said bearings being disposed on the respective axes and with the periphery of said annular bearing on one axis overlapping the first mentioned bearing on the other axis;
(d) a pair of tubular valves rotatable on said respective bearings and each free to revolve in its respective valve bore, one for intake and one for exhaust, and each having a lateral port therein movable into and out of register with the first mentioned port;
(e) and a drive means separately revolvably positioning the said tubular valves on their respective axes.

References Cited

UNITED STATES PATENTS

| 1,215,993 | 2/1917 | Rimbach | 123—190 |
| 1,273,433 | 7/1918 | Wehr | 123—190 |
| 1,361,236 | 12/1920 | Elliott | 123—190 |
| 1,740,758 | 12/1929 | White | 123—190 |

WENDELL E. BURNS, *Primary Examiner.*